(12) United States Patent
Barron

(10) Patent No.: US 6,170,865 B1
(45) Date of Patent: Jan. 9, 2001

(54) ELECTROMAGNETIC CAR SEAT RELEASE UPON DEPLOYMENT OF VEHICULAR AIR BAG

(76) Inventor: Martin Barron, 2430 Claver Rd., University Heights, OH (US) 44118

( * ) Notice: Under 35 U.S.C. 154(b), the term of this patent shall be extended for 0 days.

(21) Appl. No.: 09/236,201

(22) Filed: Jan. 23, 1999

(51) Int. Cl.⁷ .................................................. B60R 21/32
(52) U.S. Cl. .................... 280/735; 296/68.1; 297/216.18
(58) Field of Search .............................. 280/735; 180/268, 180/282; 296/68.1, 65.13, 65.14; 248/430; 297/216.18

(56) References Cited

U.S. PATENT DOCUMENTS

| | | | |
|---|---|---|---|
| 3,992,046 | * 11/1976 | Braess | 296/68.1 |
| 5,048,886 | * 9/1991 | Ito et al. | 296/65.1 |
| 5,344,204 | * 9/1994 | Yunzhao | 296/68.1 |
| 5,551,751 | 9/1996 | Dedlack et al. | |
| 5,570,903 | 11/1996 | Meister et al. | |
| 5,678,854 | 10/1997 | Meister et al. | |
| 5,765,893 | 6/1998 | Ziegler | |
| 5,791,430 | * 8/1998 | Wan | 180/282 |
| 5,803,491 | * 9/1998 | Barnes et al. | 280/735 |
| 5,947,543 | * 9/1999 | Hubbard | 296/68.1 |

* cited by examiner

Primary Examiner—Lanna Mai
Assistant Examiner—Lynda Jasmin
(74) Attorney, Agent, or Firm—Michael I Kroll (57) ABSTRACT

The present invention 18 discloses a device which will release a vehicular seal 12 in the event tile vehicle air bag 25 is deployed, for example, in the event of an accident. The apparatus discloses an electromagnetic lock assembly 24 attached to the vehicle seat 12 wherein the lock assembly 24 is releasably attached to a track 22 and wheel assembly 26 which it fixedly mounted to the vehicle in such a manner that the electromagnetic lock assembly 24 can slide back and forth upon the track 22 and wheel assembly 26. The electromagnetic lock assembly 24 of the present invention, normally keeps the lock assembly 24 in a closed position so that the seat 12 will not move. However, a sensor 44 is provided which recognizes the deployment of the vehicle air bag 25 and thereby sends an output signal to a relay switch 46 which opens the circuit which normally keeps the electromagnetic lock assembly 24 in its closed position thereby releasing the electromagnetic lock 24 and allowing the vehicle seat 12 to move in a rearward direction which movement is caused by the air bag 25 making contact with the occupant 16 and thereby pushing the occupant 16 and tie occupant's seat 12 in the rearward direction.

14 Claims, 7 Drawing Sheets

ELECTROMAGNETIC CAR SEAT RELEASE UPON DEPLOYMENT OF VEHICULAR AIR BAG

BACKGROUND OF THE INVENTION

1. Field of the Invention

The present invention relates generally to air bag deployment systems and, more specifically, to a car seat mounted on a track and having an electromagnetic lock maintaining a preselected position during normal operation of a vehicle and wherein an air bag deployment sensor will disengage said electromagnetic car seat upon deployment of said air bag allowing the force of the deployment of the air bag against the occupants of said car seat to move said seat in a rearward direction until said air bag is fully deployed and all conditions of said deployment have been met wherein said circuit will be closed therein engaging said electromagnetic lock.

2. Description of the Prior Art

There are other air bag seat restraint systems designed to prevent injury to the occupants of the vehicle. Typical of these is U.S. Pat. No. 5,765,893 issued to Ziegler on Jun. 16, 1998.

Another patent was issued to Meister et al on Oct. 21, 1997 as U.S. Pat. No. 5,678,854. Yet another U.S. Pat. No. 5,570,903 was issued to Meister et al on Nov. 5, 1996 and still yet another was issued on Sep. 3, 1996 to Sedlack et al as U.S. Pat. No. 5,551,751.

U.S. Pat. No. 5,765,893

Inventor: Douglas K. Ziegler

Issued: Jun. 16, 1998

An improved restraint apparatus for use on an infant vehicle seat to reduce head and neck injury in infants. The improved restraint apparatus comprises a shell and padded lining shaped to partially enclose an infant when the restraint apparatus is attached to the infant vehicle seat. A first envelope of support is formed in an upper portion of tile shell and padded lining to receive and support an infant head, and the first envelope of support provides a support against head movement. A second envelope of support is formed in a lower portion of tile shell and padded lining and provides a support against torso movement comparable to the support against head movement. This produces a unified restraint system between the head and torso when the restraint apparatus is attached to the infant vehicle seat.

The padded lining has soft glove like pockets that are shaped to receive, support and restrain an infant head or torso. The lining is removable for lining replacement to fit different head and torso sizes. The lining also includes distinct areas of different density in the padding to better absorb energy generated by an impact. The areas of different density in the padding apply a gradual increase in resistance against the head and torso as they are forced against the padded lining.

The improved restraint further includes adjustment for fitting the restraint apparatus to different infant length sizes.

U.S. Pat. No. 5,678,854

Inventor: Jack B. Meister

Issued: Oct. 21, 1997

An automotive vehicle supplemental restraint system that includes an air bag positioned within the vehicle opposite the passenger side of the front seat, and electronic coupled to one or more impact sensors for activating the air bag in the event of a vehicle impact. Occupancy sensors are provided at the passenger seat for sensing seat occupancy and inhibiting activation of the air bag when the seat is either unoccupied or occupied by a rear-facing infant seat. System status is displayed to a vehicle operator, and the operator is provided with an opportunity to override the occupancy sensors and enable activation;

U.S. Pat. No. 5,570,903

Inventor: Jack B. Meister

Issued: Nov. 5, 1996

An automotive vehicle supplemental restraint system that includes an air bag positioned within the vehicle opposite the passenger side of the front seat, and electronics coupled to one or more impact sensors for activating the air bag in the event of a vehicle impact. Occupancy sensors are provided at the passenger seat for sensing seat occupancy and inhibiting activation of the air bag when the seat is either unoccupied or occupied by a rear-facing infant seat. System status is displayed to a vehicle operator, and the operator is provided with an opportunity to override the occupancy sensors and enable activation of the air bag.

U.S. Pat. No. 5,551,751

Inventor: Mark A. Sedlack

Issued: Sep. 3, 1996

A NHTSA-safety compliant infant restraint with a number of advantageous features including a linkage mechanism that allows relative movement between the seat and underframe during an impact, to allow for an infant to be transported reclined while the restraint is in a rear-facing mode, while enabling the restraint to comply with NHTSA standards during a crash. The restraint may be used in a forward facing, non-rotatable position as well. A plurality of seat back incline positions may be selected for both the rearward and forward-facing modes.

While these air bag seat restraint systems may be suitable for the purposes for which they were designed, they would not be as suitable for the purposes of the present invention, as hereinafter described.

SUMMARY OF THE PRESENT INVENTION

The present invention discloses a device which will release a vehicular seat in the event the vehicle air bag is deployed, for example, in the event of an accident. The apparatus discloses an electromagnetic lock assembly attached to the vehicle seat wherein the lock assembly is releasably attached to a track and wheel assembly which it fixedly mounted to the vehicle in such a manner that the electromagnetic lock assembly can slide back and forth upon the track and wheel assembly. The electromagnetic lock assembly of the present invention, normally keeps the lock assembly in a closed position so that the seat will not move. However, a sensor is provided which recognizes the deployment of the vehicle air bag and thereby sends an output signal to a relay switch which opens the circuit which normally keeps the electromagnetic lock assembly in its closed position thereby releasing the electromagnetic lock and allowing the vehicle seat to move in a rearward direction which movement is caused by the air bag making contact with the occupant and thereby pushing the occupant and the occupant's seat in the rearward direction.

A primary object of the present invention is to provide means for allowing the seat of a vehicle to travel in a rearward direction during deployment of a vehicles air bag.

Another object of the present invention is to provide a car seat mounted on a track.

Yet another object of the present invention is to provide a car seat mounted on a track having an electromagnetic lock maintaining the predetermined position of said seat.

Still yet another object of the present invention is to provide a car seat mounted on a track having an electromagnetic lock maintaining the predetermined position of said seat and having means, for selectively changing the position of said seat.

Yet another object of the present invention is to provide a car seat mounted on a track having an electromagnetic lock maintaining the predetermined position of said seat and having means for disengaging said electronmagnetic lock during deployment of a vehicles air bag.

Additional objects of the present invention will appear as the description proceeds.

The present invention overcomes the shortcomings of the prior art by providing a car seat mounted on a track and having an electromagnetic lock maintaining a preselected position during normal operation of a vehicle and wherein an air bag deployment sensor will disengage said electromagnetic car seat upon deployment of said air bag allowing the force of the deployment of the air bag against the occupants of said car seat to move said seat in a rearward direction until said air bag is fully deployed and all conditions of said deployment have been met wherein said circuit will be closed wherein engaging said electromagnetic lock.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to the reference numerals used, the following numbering is used throughout the drawings.

10 vehicle
12 seat
14 vehicle
16 occupant
18 present invention
20 steering wheel
22 track
23 attachment means
24 electromagnetic lock assembly
25 air bag
26 wheels
28 axle
30 upper member
32 lower member
34 connection means
36 coil springs
38 wire
40 seat adjustment lever
41 steering column
42 switch of lever
44 air bag sensor
46 relay

DESCRIPTION OF THE PREFERRED EMBODIMENT(S)

Turning now respectively to the drawings, in which similar reference characters denote similar elements throughout the several views, FIGS. 1 through 5 illustrate the present invention being an electromagnetic car seat release mechanism triggered by deployment of the vehicle air bag.

Figure 1:
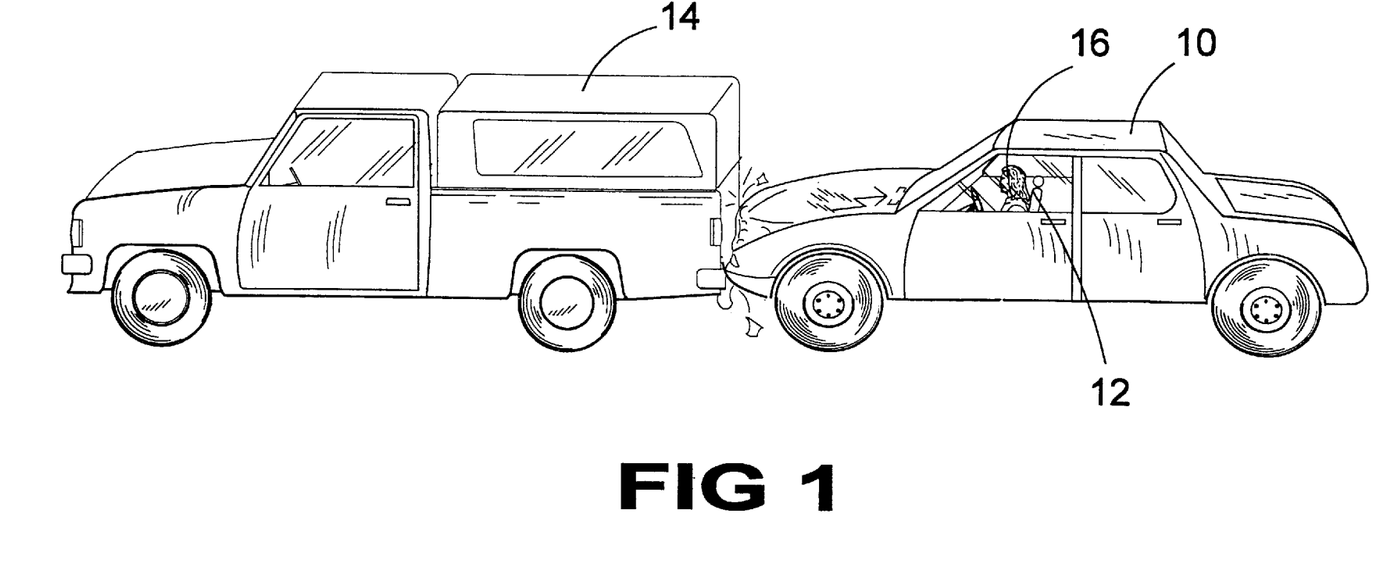
FIG. 1 is a perspective view of the typical situation wherein the air bag deployment system would be engaged.

Turning to FIG. 1, therein is shown a perspective view of a typical automobile accident scenario wherein the seat release of the present invention would be engaged. Therein is shown a first vehicle 10 containing the seat 12 upon which the present invention (not shown) is mounted. Also shown is the second vehicle 14 with which the first vehicle 10 collides. Also shown is the occupant driver 16 in the first vehicle upon which the present invention is mounted.

Figure 2:
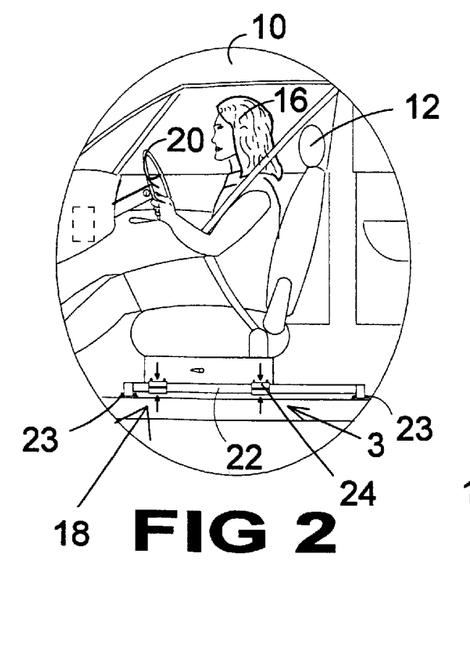
FIG. 2 is a side view of the present invention in use whereby under normal vehicular conditions the electromagnetic lock would prevent movement of the car seat.

Turning to FIG. 2, therein is shown a side view of the present invention generally shown at 18 in use whereby under normal vehicular conditions the electromagnetic lock assembly 24 being a front and rear pair would prevent movement of the car seat 12. Shown therein is the occupant 16 sitting in the car seat 12 upon which the present invention 18 is mounted with steering wheel 20 of the vehicle 10. Shown is the track 22 upon which the present invention moves and operates and is releasably attached. Tile present invention 18 has an electromagnetic lock assembly 24 which locks the present invention about the track 22 which is fixably attached to the vehicle at 23, e.g., nuts and bolts, welding, or the like.

Figure 2A:
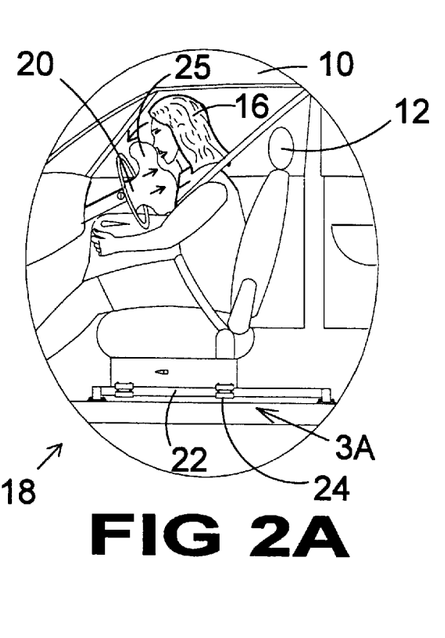
FIG. 2A is a side view of the present invention in use whereby the air bag deployment system has been engaged and the air bag is inflating as the occupant of the vehicle is propelled into the air bag.

Turning to FIG. 2A, therein is shown a side view of the present invention 18 wherein the deployment system of the air bag 25 has been engaged and the air bag 25 disposed in steering wheel 20 opposite the occupant 16 is beginning inflation as the occupant 16 of the vehicle 10 is being propelled into the air bag 25.

Figure 2B:
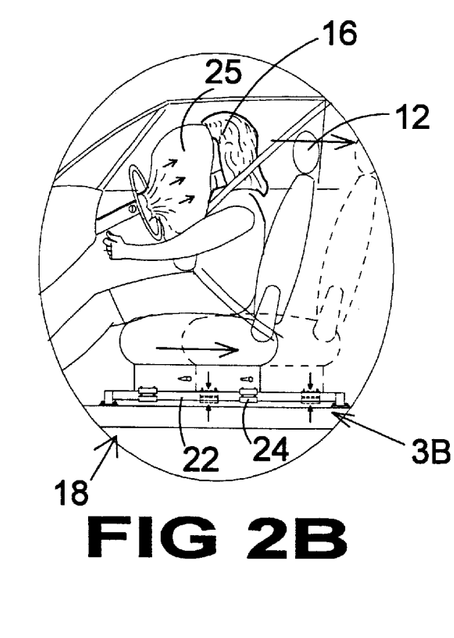
FIG. 2B is a side view of the present invention in use whereby tile air bag deployment system has been engaged and the air bag is inflating pushing the occupant of the vehicle and the seat in a rearward direction.

Turning to FIG. 2B, therein is shown a side view of the present invention 18 wherein the air bag 25 deployment system has initiated the deployment of the air bag 25. The air bag deployment system has been engaged, the electromagnetic lock assembly 24 has been released from the track 22 and the air bag 25 is continuing to be inflated and is pushing the occupant 16 and the seat 12 in the rearward direction. This will prevent serious injury to the occupant 16 frequently caused by inflation of an air bag 25.

Figure 3:
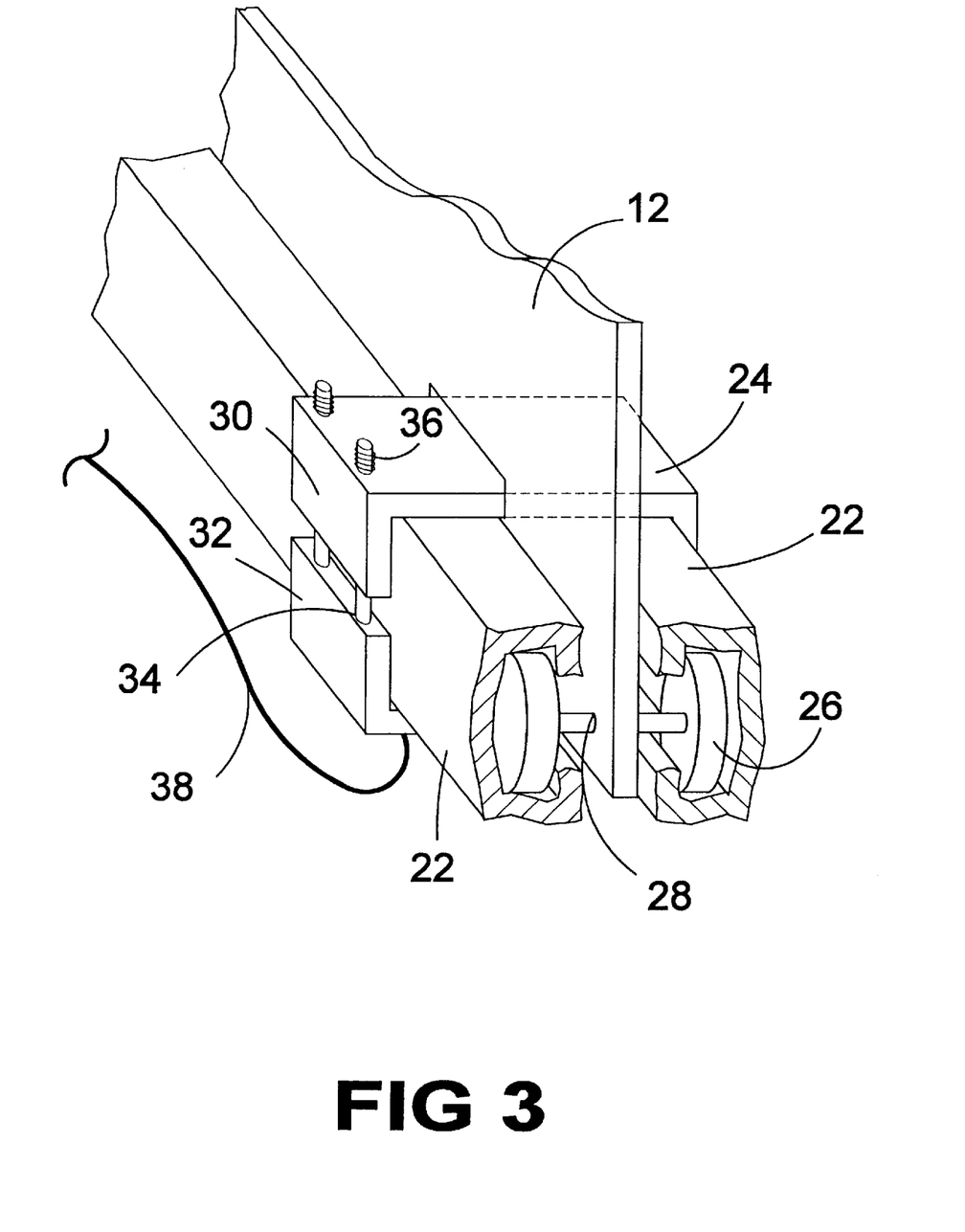
FIG. 3 is an enlarged view of the car seat attached to a plurality of wheels riding in a track having an electromagnetic lock attached to the seat and engaging the track.

Turning to FIG. 3, therein is shown an enlarged view of the car seat 12 attached to an electromagnetic lock assembly 24 which is attached by means to a plurality of wheels 26 which ride in a track 22. Note that the track assembly 22 is a pair of parallel tracks mounted within the electromagnetic lock assembly 24 having a pair of wheels 26 connected by an axle 28 having the seat 12 vertically interposed between the two parallel generally horizontal track assemblies 22 and wheel assemblies 26. There would be a track assembly 22 on each side or edge of the seat 12. The electromagnetic lock assembly 24 comprises an upper U-shaped member 30 opposing a lower U-shaped member 32 having means for connecting 34 to each other which could be pens, rods or cylindrical shafts having coil springs 36 for biasing the U-shaped members toward each other in the normally closed position. Also shown is electrical connection wire 38 used to activate the electromagnetic lock assembly which is made and operates as the standard type.

Figure 3A:
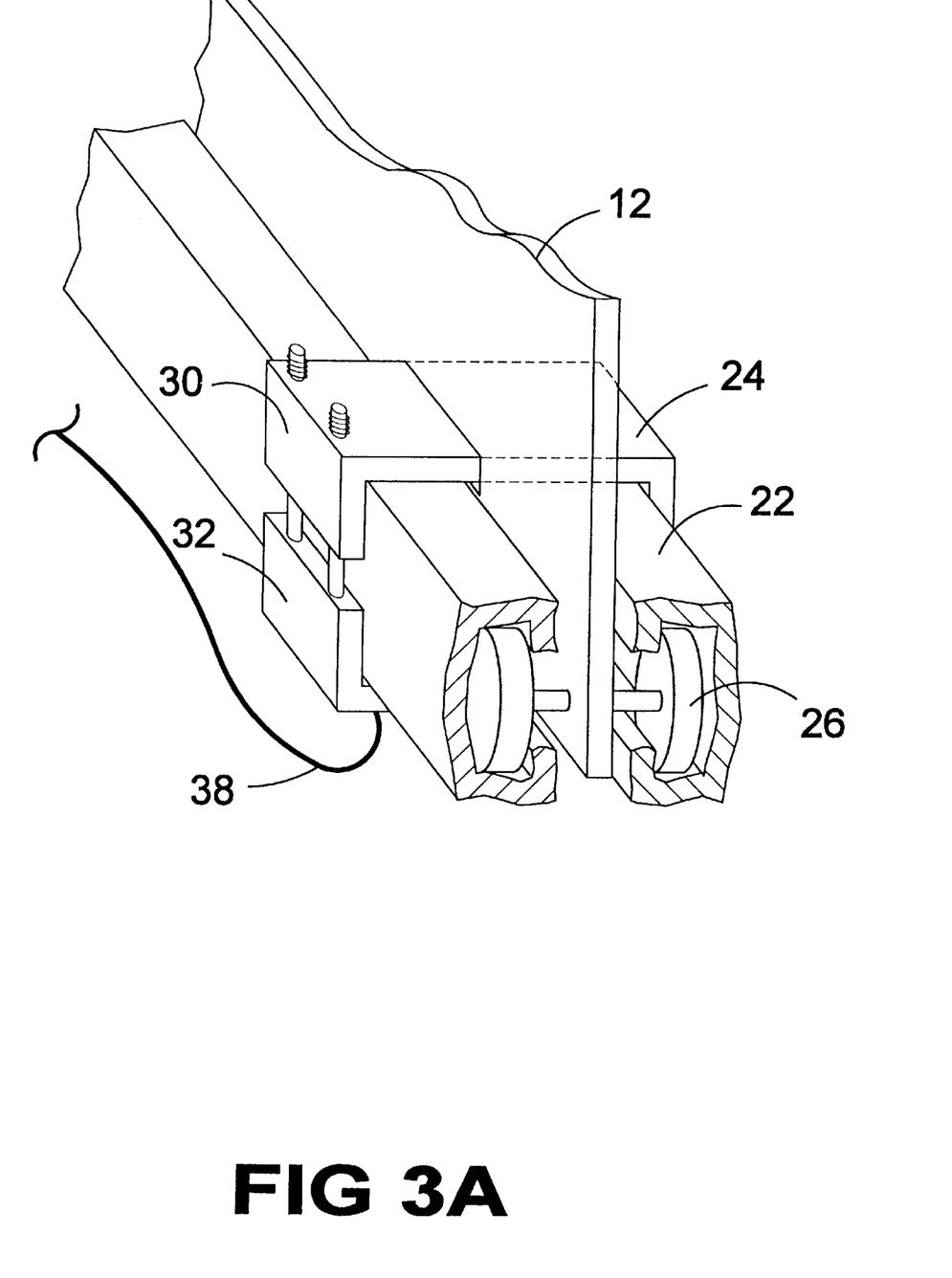
FIG. 3A is an enlarged view of the car seat, taken from the general direction shown in FIG. 2A, attached to a plurality of wheels riding in a track having an electromagnetic lock attached to the seat and wherein the electromagnetic lock has been disengaged by the air bag deployment sensor.

Turning to FIG. 3A, therein is shown an enlarged view of the car seat 12 attached to a electromagnetic lock assembly 24 which is attached to a plurality of wheels 26 which ride in a track 22 wherein the lock assembly 24 is disengaged by the air bag deployment means. Note that the disengagement of the lock assembly 24 is accomplished by having the upper and lower members 30, 32 move apart from each other disengaging from contact with tile track 22 so that the seat 12 can move or slide along the track 22. Also, shown are other elements shown in FIG. 3.

Figure 3B:
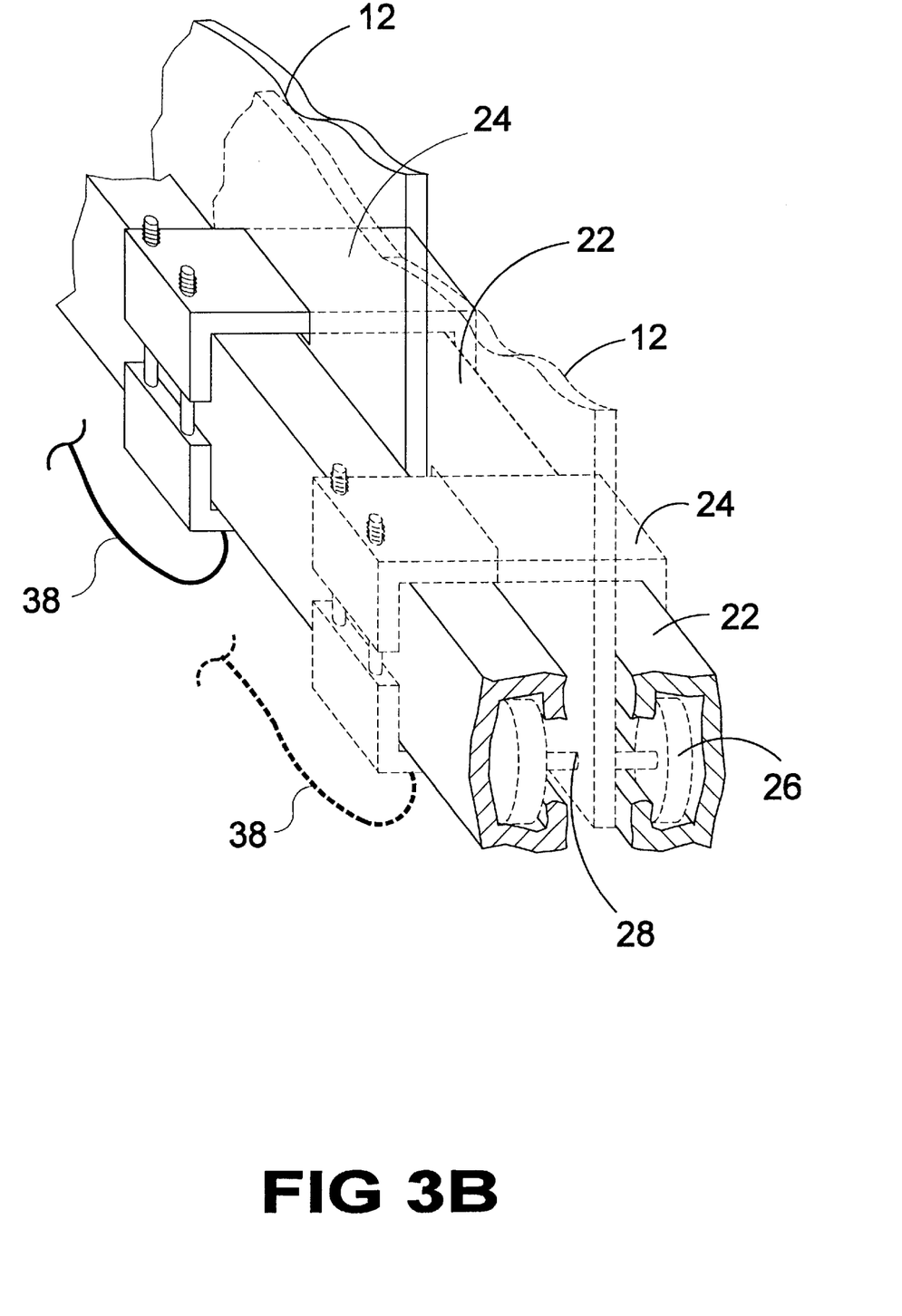
FIG. 3B is an enlarged view of the car seat, taken from the general direction shown in FIG. 2B, attached to a plurality of wheels riding in a track having an electromagnetic lock attached to the seat and wherein the car seat is being moved in a rearward direction by the force exerted by the air bag upon the occupant and the car seat.

Turning to FIG. 3B, therein is shown an enlarged view of the car seat, 12, taken from the general direction shown in FIG. 2B, attached to axle 28 of a plurality of wheels 26 riding and operating in a track assembly 22 having an electromagnetic lock assembly 24 attached to the seat 12, wherein the car seat 12 is a being moved in a rearward direction by the force exerted by the air bag 25 upon the occupant 16 and the car seat 12. Note that the electromagnetic lock assembly 24 is moved from a forward position to a more rearward position after the electromagnetic lock assembly 24 has been disengaged by the air bag deployment sensor.

Figure 4:
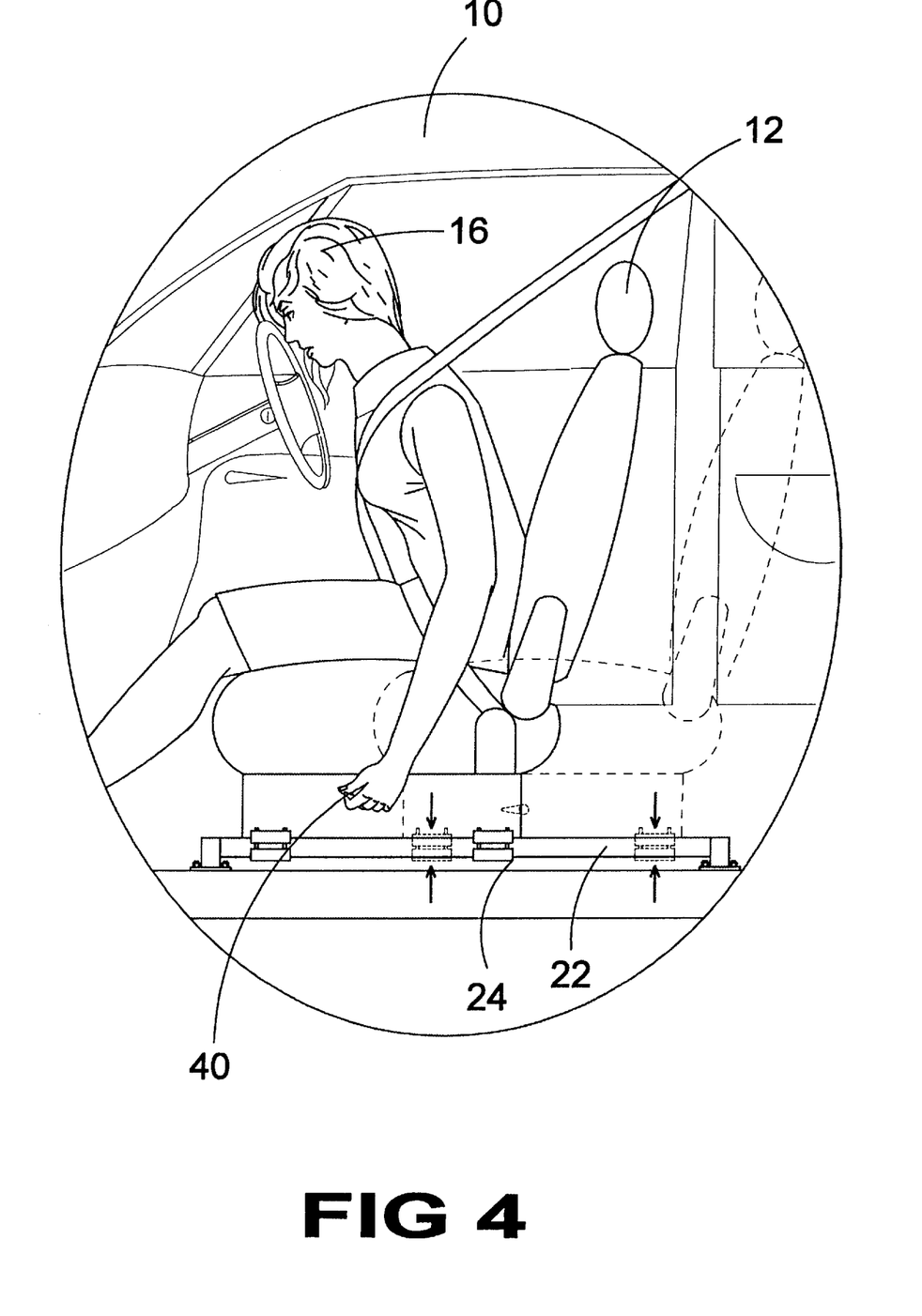
FIG. 4 is a side view of the car seat being adjusted by the occupant of the vehicle by using the seat adjustment lever which breaks the circuit allowing the seat to be selectively positioned whereupon the occupant releases the lever and the electromagnetic lock is engaged.

Turning to FIG. 4, therein is shown a side view of the car seat 12 being adjusted by the occupant 16 in the vehicle 10 by using the seat adjustment lever 40 which is electrically connected so as to break the circuit which keeps the electromagnetic lock assembly 24 normally closed thereby allowing the seat 12 to be selectively positioned whereupon the occupant 16 releases the lever 40 and the electromagnetic lock assembly 24 is engaged and locked.

Figure 5:
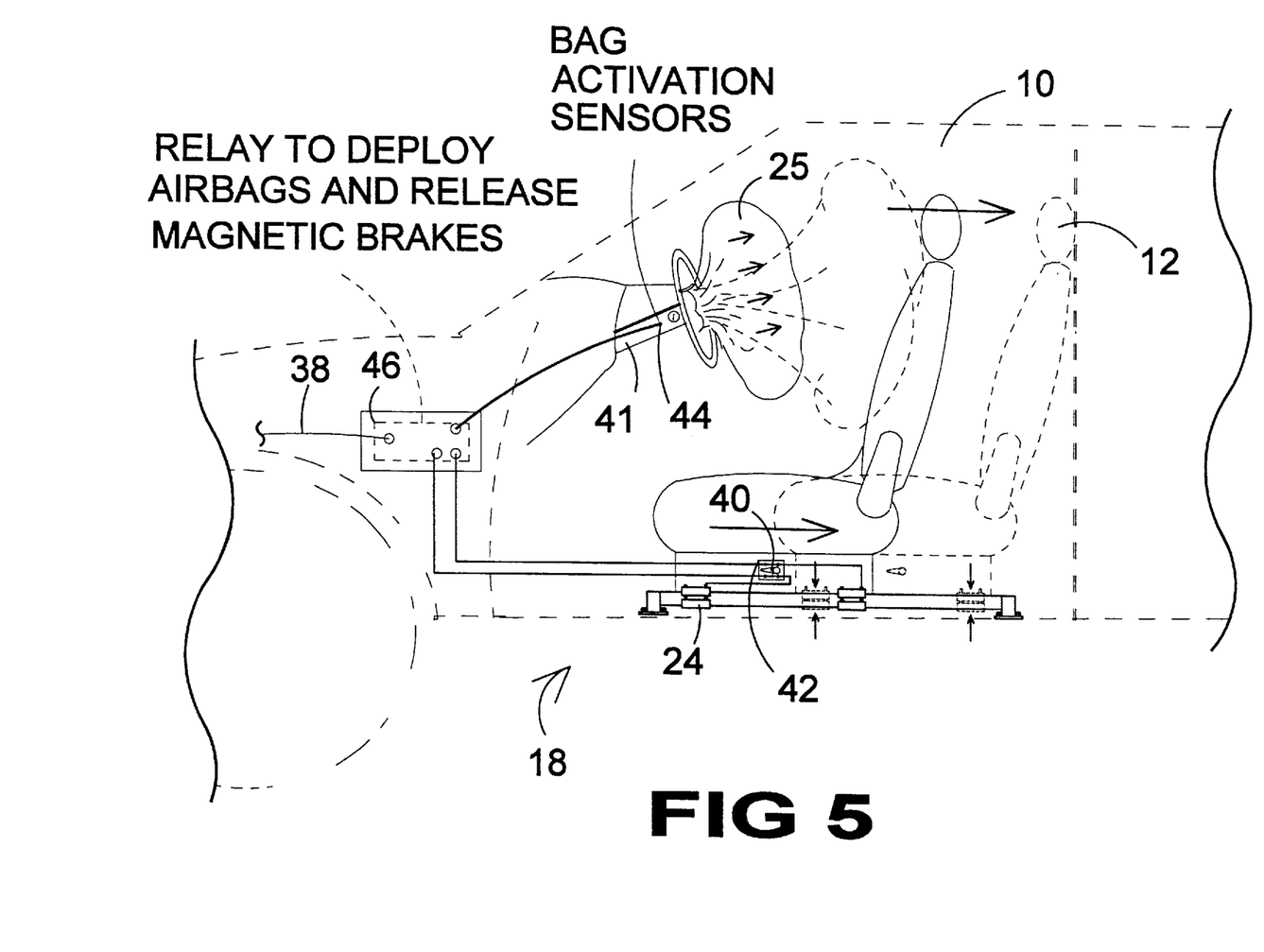
FIG. 5 is a side view of vehicle having the present invention installed. Shown is a vehicle having an electromagnetic lock being attached to the seat and being in contact with the car seat track and being powered by the car battery. The seat has a scat adjustment lever which acts as a switch opening the circuit between the air bag sensor, car battery and electromagnetic lock when moved to a predetermined position. Further the air bag sensor acts as a switch opening the circuit between the car battery, car seat lever, and electronmagnetic lock thereby enabling rearward movement of the car seat.

Turning to FIG. 5, therein is shown a side view of the vehicle 10 having the present invention 18 installed therein. Shown is a vehicle 10 having an electromagnetic lock assembly 24 attached to a seat 12 which has communicating means with the car seat track 22 which lock assembly is powered by the car battery (not shown). The seat 12 has a car seat adjustment lever 40 which acts as the control of an electrical switch 42 which when operated opens the circuit between the air bag sensor 44, the car battery and the electromagnetic lock assembly 24 when the switch is moved to a predetermined position so that the seat 12 can be moved. Further, the air bag sensor 44 disposed in the steering wheel column 41 which senses deployment of the air bag 25 and sends a signal to the relay 46 opening tile circuit between the car battery, the car seat lever 40 and the electromagnetic lock assembly 24 thereby enabling rearward movement of the car seat 12. Also shown is electrical connection 38 to the battery. Note the electromagnetic lock assembly 24 is normally closed being energized by the vehicle battery; assembly 24 can be opened by the seat adjustment lever 40 being activated by the driver or the air bag activation sensor 44, either of which will open the relay 46 or control electronics between the battery power source and the assembly 24 so that assembly 24 can be moved on track 22.

What is claimed is:

1. An apparatus for releasing a vehicle seat upon deployment of the vehicle air bag, comprising:

a) electrically operated first means for locking the seat of the vehicle in position;

b) a second means for connecting the seat to said first means for locking said seat of the vehicle;

c) a wheel assembly to which the seat of the vehicle is attached;

d) a track assembly within which said wheel assembly operates and to which said first means for locking the seat is attached;

e) said track assembly fixedly mounted to the vehicle;

f) electrically operated third means for controlling said first means for locking the seat; and g) means for releasing said vehicle seat upon deployment of the vehicle air bag.

2. The apparatus of claim 1, said first means for locking said seat further comprising electromagnetic means for locking about said track assembly.

3. The apparatus of claim 2, said electromagnetic means further comprising an upper and a lower member for locking about said track assembly.

4. The apparatus of claim 1, wherein said first means for locking said seat of the vehicle is normally in the locked position about said track assembly.

5. The apparatus of claim 1, further comprising means for sensing the deployment of the vehicle air bag.

6. The apparatus of claim 5, wherein said third means for controlling said first means for locking said seat is activated by said means for sensing the deployment of the vehicle air bag, said third means for controlling said first means for locking said seat unlocking said first means for locking said seat whereby the seat is free to move upon deployment of the air bag.

7. The apparatus of claim 1, said third means for controlling further comprising a seat adjustment lever operable by the vehicle driver.

8. The apparatus of claim 7, said seat adjustment lever further comprising an electrical switch for releasing said first means for locking said seat of a vehicle whereby said seat is free to move.

9. The apparatus of claim 1, said track assembly further comprising a pair of track assemblies located under each side of the seat whereby the seat can be adjusted.

10. The apparatus of claim 9, each said track assembly further comprising a pair of parallel tracks upon which the seat is movable.

11. The apparatus of claim 1, said wheel assembly further comprising a pair of wheels.

12. The apparatus of claim 11, further comprising an axle connecting said pair of wheels to each other.

13. A method for releasing a vehicle seat upon deployment of the vehicle air bag, comprising the steps of:

a) providing a vehicle seat having first electromagnetic means for being slidably adjusted upon a second fixedly mounted means to the vehicle;

b) maintaining said means for adjustment in a normally closed position;

c) sensing air bag deployment of the vehicular air bag; and, d) opening the circuit which maintains said first means in a normally closed position, whereby, said first means is movable.

14. The method of claim 13, further comprising the step of providing a seat adjustment lever further comprising an electrical switch for releasing said first means whereby the seat is free to move said adjustment lever being operable by the vehicle driver.

* * * * *